(12) United States Patent
Siferd et al.

(10) Patent No.: US 6,199,592 B1
(45) Date of Patent: Mar. 13, 2001

(54) PIPE STRUCTURE AND METHOD OF MANUFACTURE

(75) Inventors: Roger Lee Siferd; Matthew C. Ankrom; Larry E. Porter, all of Findlay, OH (US)

(73) Assignee: Hancor, Inc., Findlay, OH (US)

( * ) Notice: Subject to any disclaimer, the term of this patent is extended or adjusted under 35 U.S.C. 154(b) by 0 days.

(21) Appl. No.: 09/245,766

(22) Filed: Feb. 5, 1999

(51) Int. Cl.$^7$ ........................................ F16L 9/00
(52) U.S. Cl. .................. 138/109; 138/155; 138/120; 138/121; 285/903
(58) Field of Search ...................... 138/109, 121, 138/155, 120, 173, 172; 285/903, 138.1

(56) References Cited

U.S. PATENT DOCUMENTS

| | | | |
|---|---|---|---|
| Re. 29,446 | 10/1977 | Sonnleitner et al. ............... | 425/297 |
| 3,520,047 | 7/1970 | Mühlner et al. .................... | 29/423 |
| 3,632,732 | 1/1972 | Osterhagen et al. ............... | 264/312 |
| 3,749,543 | 7/1973 | Stansbury .......................... | 425/393 |
| 3,806,301 | 4/1974 | Osterhagen et al. ............... | 425/393 |
| 3,823,216 | 7/1974 | Petzetakis ........................... | 264/89 |
| 3,998,578 | 12/1976 | Acda ................................. | 425/393 |
| 4,005,968 | 2/1977 | Crawford ........................... | 425/384 |
| 4,030,872 | 6/1977 | Parmann ............................ | 425/393 |
| 4,107,249 | 8/1978 | Murai et al. ....................... | 264/68 |
| 4,134,949 | 1/1979 | McGregor .......................... | 264/519 |
| 4,150,087 | 4/1979 | de Putter et al. .................. | 264/296 |
| 4,157,372 | 6/1979 | Kyomen ............................ | 264/296 |
| 4,161,384 | 7/1979 | McGregor .......................... | 425/388 |
| 4,170,448 | 10/1979 | French .............................. | 425/393 |
| 4,177,237 | 12/1979 | Ueno et al. ........................ | 264/296 |
| 4,204,823 | 5/1980 | Hayes et al. ....................... | 425/393 |
| 4,218,208 | 8/1980 | Hayes et al. ....................... | 425/388 |
| 4,239,473 | 12/1980 | Fulhaber ............................ | 425/392 |
| 4,266,926 | 5/1981 | Gordon ............................ | 425/387.1 |
| 4,277,231 | 7/1981 | Gordon ............................ | 425/387.1 |

(List continued on next page.)

OTHER PUBLICATIONS

Corma Inc., "Vacuum Method versus Blow Molding Method", Aug. 1992.

Corma Inc., "Fabricators of the Best–Selling Corrugator Equipment in the World", Jun. 1997.

Primary Examiner—Patrick Brinson
(74) Attorney, Agent, or Firm—Jones, Day, Reavis & Pogue

(57) ABSTRACT

A pipe section formed of a polymeric material which has a substantially constant thickness throughout, the terminal edge of the female connection having a reinforcement structure which rigidifies the end of the female connection and prevents deformation, the pipe section preferably having a flared end, and the reinforcement structure preferably being a semicircular channel formed at the end of the pipe section by a mandrel after initial extrusion of the pipe section; along with a method and apparatus for forming the pipe section, a pipe assembly including such pipe section, and a method of forming the pipe assembly.

38 Claims, 8 Drawing Sheets

U.S. PATENT DOCUMENTS

| | | | |
|---|---|---|---|
| 4,279,853 | 7/1981 | Ohta et al. | 264/230 |
| 4,299,412 | 11/1981 | Parmann | 285/110 |
| 4,315,630 | 2/1982 | French et al. | 277/207 A |
| 4,331,625 | 5/1982 | van de Zee et al. | 264/249 |
| 4,338,716 | 7/1982 | Marissen et al. | 29/456 |
| 4,353,860 | 10/1982 | Gordon | 264/519 |
| 4,362,187 * | 12/1982 | Harris et al. | 138/109 |
| 4,379,115 | 4/1983 | Seach et al. | 264/296 |
| 4,395,379 | 7/1983 | Herder et al. | 264/573 |
| 4,428,591 * | 1/1984 | Marissen et al. | 138/109 X |
| 4,474,726 | 10/1984 | Ohta et al. | 264/516 |
| 4,481,978 * | 11/1984 | Escandell | 138/173 X |
| 4,545,951 | 10/1985 | Gordon | 264/322 |
| 4,643,658 | 2/1987 | Gordon | 425/110 |
| 4,723,905 | 2/1988 | Vasallo et al. | 425/392 |
| 4,779,651 * | 10/1988 | Hegler et al. | 138/109 |
| 4,826,028 | 5/1989 | Vasallo et al. | 277/207 A |
| 4,834,430 | 5/1989 | Vasallo et al. | 285/379 |
| 4,865,362 * | 9/1989 | Holden | 138/109 X |
| 4,880,579 | 11/1989 | Murata et al. | 264/26 |
| 4,906,010 | 3/1990 | Pickering et al. | 277/207 A |
| 4,915,425 * | 4/1990 | Hegler et al. | 138/173 X |
| 4,968,241 | 11/1990 | Darling | 425/509 |
| 5,064,207 | 11/1991 | Bengtsson | 277/207 A |
| 5,158,389 * | 10/1992 | Osterwald et al. | 138/173 X |
| 5,296,188 | 3/1994 | Lupke | 264/508 |
| 5,348,051 * | 9/1994 | Kallenbach | 138/109 |
| 5,678,610 * | 10/1997 | Scarazzo et al. | 138/109 |
| 5,992,469 * | 11/1999 | Hegler | 138/109 |
| 5,996,635 * | 12/1999 | Hegler | 138/109 |

* cited by examiner

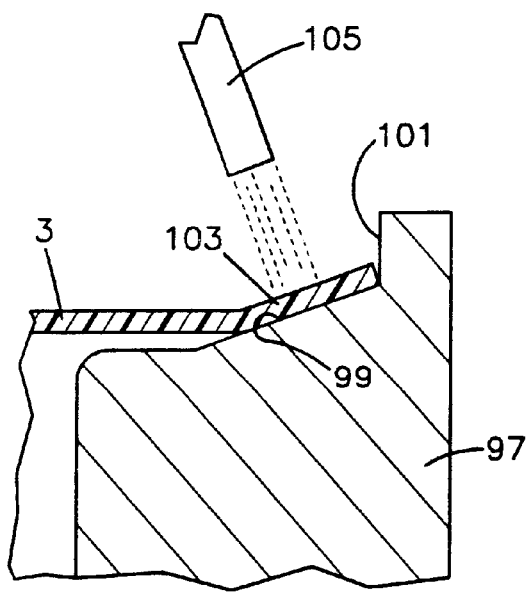
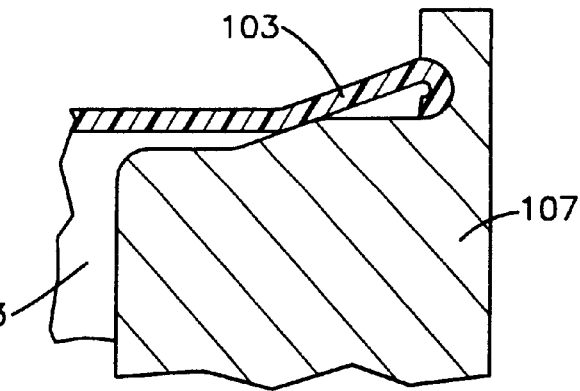
Fig.14                Fig.15
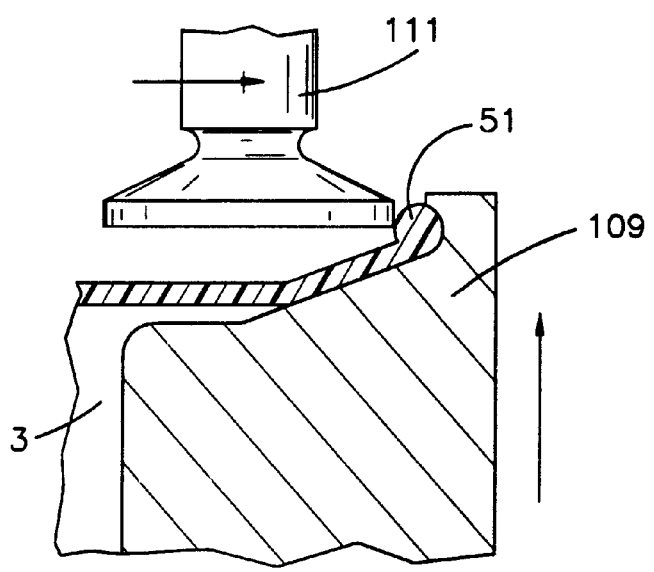
Fig.16

PIPE STRUCTURE AND METHOD OF MANUFACTURE

FIELD OF THE INVENTION

This invention relates to pipes made from polymeric material, and more particularly to pipes made as segments which are assembled into larger pipe systems during installation.

BACKGROUND OF THE INVENTION

During recent years, it has become more and more common for pipes for the transmission of fluids to be made from plastic materials.

Non-metal materials are made into various types of pipes by several methods. For instance, it is known to extrude PVC into various shaped pipes. Another more economical method is the corrugated pipe technique, which uses blow mold and vacuum mold techniques to produce a pipe which is formed as extruded tubes of a polymer such as HDPE (high density polyethylene). Systems for fabricating such corrugated pipes are sold by Corma, Inc. of Concord, Ontario. A system of this type is also described in U.S. Pat. No. 5,296,188, which is herein incorporated by reference.

Polymer material pipes are generally manufactured as continuous extrusions which are then cut into sections. Frequently, each section has a male end and a female end, and these sections are linked sequentially across the distance needed for the pipe to extend. The female end of the pipe, sometimes called a bell, receives the male end, sometimes called a spigot, of the next pipe therein.

One problem presented in such pipes derives from the fact that, during fabrication, the material from which the pipe is made is heated, and then cooled. As different portions of the pipe cool and shrink at different rates, stresses are created. If the pipe is then exposed to heat, even such as that of strong sunlight, it may cause enough warming to soften portions of the pipe.

The result of this is that portions of the bell are altered from the desired shape. As a result, the bell, which is optimally an open flared cone or skirt with a circular mouth, "flowers", i.e., deforms into a roughly clover-leaf or flower cross-section. This flowered structure presents problems when the pipe sections are to be assembled, since the puckering of this shape may make the female end of the pipe too small to easily accommodate the male end of the next pipe section. This means that the construction crew must try to pry the flowered bell apart to insert the male portion. This is inefficient in terms of labor costs and time. Moreover, the flowering can render the pipe section completely unusable.

Similarly, stacking of the pipe section can create loads in the female end of the pipe section. If environmental factors such as heat created by sunlight or high ambient temperatures are present, this can soften the material to the degree that deformation occurs.

OBJECTS AND SUMMARY OF THE INVENTION

It is therefore an object of the invention to provide a pipe section having a female end with a strengthened periphery.

It is also an object of the invention to provide a pipe section with a female end resistant to deformation.

It is another object of the invention to provide a pipe section which is readily connected with another pipe section to form a pipe assembly.

It is still another object of the invention to provide a pipe assembly which is efficiently and cost-effectively fabricated in the field and is reliably sealed against leakage.

It is a further object of the invention to provide a method and apparatus for making the pipe section of the invention.

It is yet another object of the invention to provide a method of fabricating the pipe assembly of the invention.

Accordingly, in one aspect the invention is a pipe section which comprises a segment of polymeric material configured as a conduit having an end strengthened by a reinforcing structure formed integrally of said material around the periphery of said end.

In another aspect, the invention is a pipe assembly for accommodating fluid flow therethrough, which includes a first pipe section comprising a segment of polymeric material configured as a conduit and having a male end and a female end, said first pipe section's female end being flared and being strengthened by a reinforcing structure formed integrally of said material around the periphery of said female end, and a second pipe section comprising a segment of polymeric material configured as a conduit and having a male end and a female end, said male end of said second pipe section being in the female end of the first pipe section such that fluid may flow from one of said sections into the other.

In a further aspect, the invention is a method of forming a pipe section, which comprises subjecting an end of a segment of polymeric material configured as a conduit to conditions sufficient to render the material proximate such end plastic, and turning the plastic polymeric material at such end back away from the end to form an integral reinforcing structure.

In yet another aspect, the invention is method of fabricating a pipe assembly for accommodating fluid flow therethrough, said assembly including a first pipe section comprising a segment of polymeric material configured as a conduit and having a male end and a female end, said female end being flared and being strengthened by a reinforcing structure formed integrally of said material around the periphery of said female end, and a second pipe section comprising a segment of polymeric material configured as a conduit and having a male end and a female end, which method comprises bringing the female end of said first pipe section and the male end of said second pipe section into approximate registration by inserting the male end of the second pipe into the flared female end of the first pipe section, and connecting the male end of the second pipe section and the female end of the first pipe section when the two sections are in alignment, such that fluid may flow from one of said sections into the other.

In still another aspect, the invention is an apparatus for forming a reinforcing structure on an open end of a polymeric pipe section, which has a mandrel having a wall for contacting said pipe section. The mandrel includes a first portion wherein the wall is configured to be received in the open end of the pipe section, and another portion in which the wall extends outwardly of the first portion in arcuate fashion such that an annular pocket is formed. The apparatus has means for holding the pipe section in an orientation such that it and the mandrel can be brought into contact, with the mandrel's first portion being first received in the opening at the end of the pipe section. The apparatus also has means for causing movement of the mandrel and the pipe section holding means relative to one another such that the mandrel and the pipe section come together with the mandrel's first portion being received by the opening at the end of the pipe section, and thereafter the annular pocket of the third portion coming into contact with and deforming the end of the pipe section to form a reinforcing structure.

Of course, it will be understood that the invention pertains not only to straight-line pipe sections but also to all other configurations, such as elbow-shaped or T-shaped fittings.

Substantial benefits are conferred by practice of the invention. The provision of a reinforcing structure integral with the subject pipe section, proximate the periphery of the female end, effectively strengthens the structure so that it maintains its desired shape, resists deformation during storage before use, and can withstand rough handling during connection of other piping to it. The pipe assembly incorporating such pipe section is cost effectively fabricated in the field and has increased strength at the point of interface during the connection operation, with the result that such operation is made easier and more efficient. And, the method and apparatus for making the pipe section, as well as the method for making the aforementioned pipe assembly, of the invention are correspondingly convenient and cost effective.

Other objects and benefits of the invention will become apparent from the present specification, and the invention will be set forth in the claims.

BRIEF DESCRIPTION OF THE DRAWINGS

FIGS. 14–16 are detailed sectional views of mandrels for forming rim structures of alternate embodiments.

DETAILED DESCRIPTION OF CERTAIN PREFERRED EMBODIMENTS OF THE INVENTION

Figure 1:
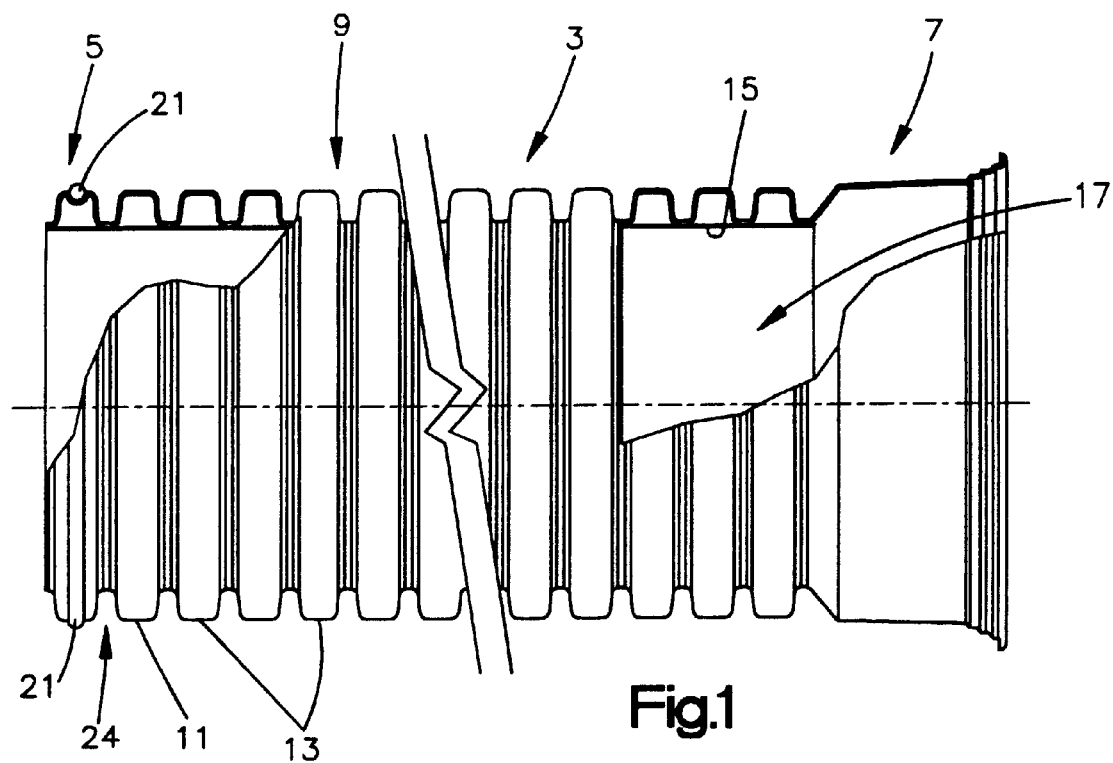
FIG. 1 is a partly cut away elevational view of a pipe section of the invention.

A central feature of our invention is formation of the integral reinforcing member on the female end of a subject pipe section. This member reinforces the female end's peripheral edge so that it can withstand rough contact, jostling and the like when a male end of another pipe section is inserted and moved around to secure alignment pursuant to connection of the pipe sections. Typically, practice of the present invention results in attainment of a hoop strength at the reinforced female end of at least 10, and preferably at least 15, pounds (e.g. for 4-inch diameter conduit) and in some cases 50, and preferably at least 80, pounds (e.g., for 12-inch diameter conduit), hoop strength being defined as the amount of force needed to laterally compress a pipe by 5% of its diameter. Moreover, the reinforcing member strengthens the female end of a subject pipe section, especially when flared, against deformation resulting from flowering by providing a skeletal frame which holds the end in its desired shape. Also, the reinforcing member provides extra support while the pipe section is being stored, for example, stacked in contact with other pipe sections. In the event ambient conditions such as heat, sunlight or the like cause a softening of the pipe section's constituent material the reinforcing member contributes added structural integrity so that degradation which might otherwise occur can be prevented or at least decreased substantially.

While useful with a range of materials, the invention is especially applicable to piping made of polymeric materials such as polyethylene, polypropylene and PVC (in certain good embodiments, especially with polypropylene and PVC for instance, filler is also incorporated to reduce cost). Over and above such materials' intrinsic value in piping applications, they are particularly useful for producing piping in a variety of shapes and styles, especially piping having a corrugated wall, which structure confers a relatively greater strength to weight ratio vis-a-vis non-corrugated piping. This is a consequence of the fact that the solidified polymeric materials of which conduit is made characteristically are formed from precursors (such as the polymeric material at elevated temperature, e.g., hot polyethylene, or a reaction mixture subjected eventually to curing conditions) which have rheological properties permitting material flow until setting. Since such precursors are highly formable, the polymeric materials are particularly useful in extrusion processes, and other processes which similarly require a high degree of formability, for making the corrugated pipe sections on other shapes and styles contemplated in connection with the present invention.

It follows that a preferred embodiment of the invention is a method of forming a pipe section, which comprises subjecting an end of a length of polymeric material configured as a conduit with a corrugated wall to conditions sufficient to render the material proximate said end plastic; shaping the plastic polymeric material proximate said end into a flared portion; turning the plastic material at the end of said flared portion back away from the end to form an integral reinforcing structure.

The characteristics of the inventive pipe section as herein described lead to a highly advantageous pipe assembly comprising at least two pipe sections aligned and connected utilizing the invention. As brought out in more depth below, the present invention is very effective in maintaining the shape of a subject pipe section's female end so that a good fit between it and the male end of another pipe section can reliably be achieved, without the necessity for mechanical working of such female end in order to return it to its initial configuration conforming to and accommodating the shape of the male end. Moreover, when the female end of a subject pipe section is flared, the reinforcing member has the further effects of dimensionally stabilizing the flared end (again for the purpose of reliably accommodating the other pipe section's male end), and strengthening the edge of the flared portion so that movement therein of the other pipe section's end to achieve the desired alignment can be carried out with decreased danger of deformation of the flared portion through rough contact, etc.

It can, therefore, be seen that another preferred embodiment of the invention is that it involves a method of fabricating a pipe assembly as aforesaid. In this method the pipe section is formed from a polymeric material, and it has a first tubular conduit. A female connection on the end of the conduit has a generally cylindrical or conical structure which extends from the end of the conduit.

The terminal portion of the end structure is then heated to make the material plastic. The terminal portion of the female connection and a mandrel are then pressed together. The mandrel has a pocket structure which causes the heated end of the female connection to bend backwards to form a reinforcing rim structure. The heated end is then allowed to set. The cooled material of the rim structure reinforces the female connection so that the flowering and other deformation problems of the prior art are not encountered.

To provide an integrated treatment of various structural aspects of the invention, we consider a pipe assembly formed of at least first and second pipe sections. The first pipe section comprises a tubular conduit with a female connection on the end. The second pipe section has a tubular conduit with a male connection on its end. The female connection receives the male connection so that the interior of the first pipe section communicates with the interior of the second pipe section, and water or other fluid can flow through the pipe assembly.

The female connection is formed of a polymeric material. It has a first connection portion which is connected to the end of the conduit and extends longitudinally away from it. The female connection also has an annular terminal edge which defines an opening at the end of the pipe section. The terminal edge has a reinforcement structure which rigidities the end of the female connection and prevents the flowering and other deformation problems of the prior art.

The reinforcement structure preferably includes a first annular portion formed integral with the first connection portion, a second annular portion formed integral with this portion and extending radially inwardly or outwardly of the first annular portion, and a third annular portion which is formed integral with the second annular portion and extends longitudinally inwardly of the first pipe section.

In a preferred embodiment, the first pipe section has a corrugated outer structure of the same polymeric material as the female connection affixed to the outer surface of the conduit. Preferably, the corrugated outer surface is formed integral with the female connection portion and is of material which is substantially the same thickness as in the female connection.

The female connection is also provided with a widening flared opening to aid assembly of the pipes in, for instance, a trench, where it is difficult to perfectly align the pipe sections for assembly. This is a valuable feature, since it is often fairly difficult to align the pipes precisely before pressing them together; provision of a flared portion which helps guide another pipe section's end toward the female connection site expedites attaining alignment. In such connection, it should be noted that as used herein: the term "approximate registration" refers to the condition in which two pipe sections are oriented vis-a-vis one another that the male end of one can be or is inserted into the flared female end of the other; and the term "alignment" refers to the condition of such section. The flare also enhances the structural strength of the end of the pipe section.

The rigidity of the female connection also may be enhanced by the use of several crimped or creased portions of the end portion which additionally reinforce the structure of the female connection.

Now, with reference to the figures of drawing, as best seen in FIG. 1, a pipe section, generally indicated at 3, extends longitudinally between a male end or spigot, generally indicated at 5, and a female end or bell, generally indicated at 7.

Intermediate these two ends is a middle length of the pipe section generally indicated at 9, which is shown in contracted cut-away in FIG. 1. The usual length of the pipe sections of this type is about 20 feet, although there may be variations in this depending on the application and environment for which the use is desired. Inner diameters of the pipes may vary widely, but in the preferred embodiment range from about 10 inches to about 37 inches.

The pipe section 3 has an outer structure 11 which is preferably formed of a continuous extrusion of polymer material, most preferably a thermoplastic such as high density polyethylene (HDPE). The outer structure 11 has a number of ring-shaped corrugations 13 each extending around the pipe. Alternatively, the outer structure may have a different pattern, such as spiral corrugations.

The inside of the pipe section 3 is a tubular or cylindrical conduit 15 which extends between the male and female ends 5 and 7 and which is bonded to the corrugated structure 11 during fabrication of the pipe section. The conduit is preferably also formed as a continuous extrusion of polymer material, most preferably HDPE. This inner cylindrical conduit 15 defines a passage generally indicated 17 going through the pipe section from the male end 5 to the female end 7.

Figure 2:
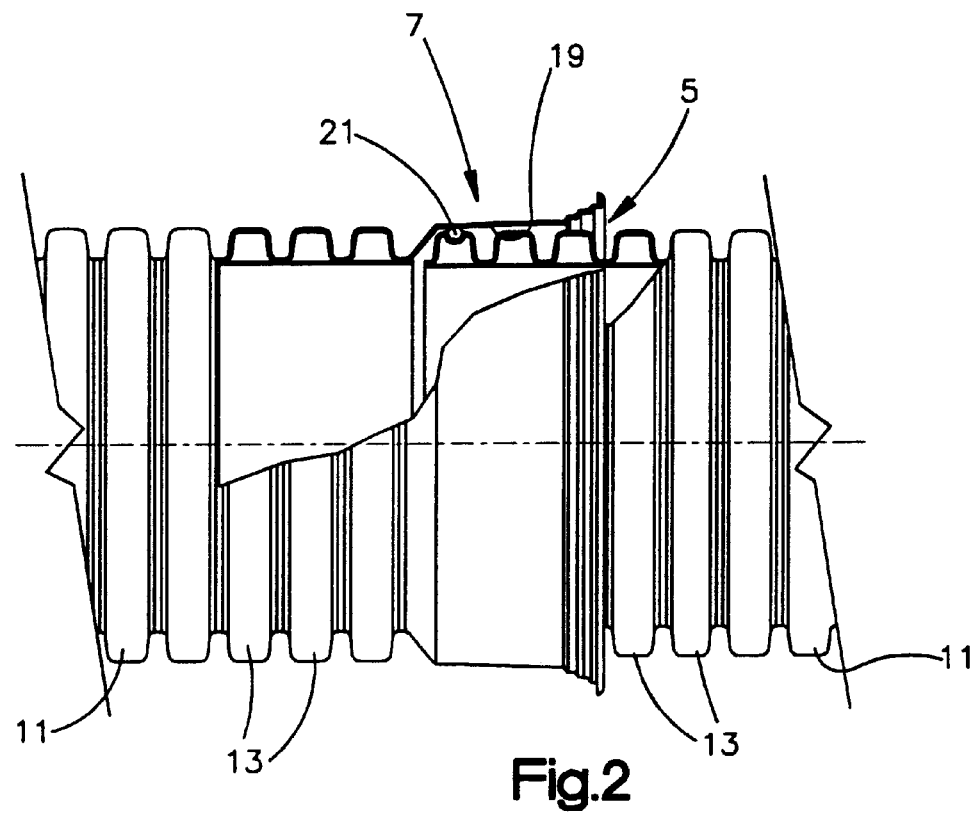
FIG. 2 is a partially cut away elevational view of the connection between the male and female connection portions of two adjacent pipe sections according to the invention.

During assembly of the pipe sections, as best shown in FIG. 2, the male end 5 is inserted into the female connection 7. The female connection provides a inwardly facing conical engagement surface 19 against which abuts a resilient sealing member 21, which is a gasket, preferably an extruded rubber profile, supported in a radially outwardly facing recess on the last corrugation 23 of the male end 5 of the pipe section 3. Alternatively, a gasket may be held in the valley 24 between the first and second corrugations at the male end 5, which gasket is radially wide enough to sealingly engage surface 19. This engagement between the sealing member 21 and the engagement surface 19 effectively seals the joint so that fluids passing through the pipe sections do not leak out in appreciable amounts. The engagement surface 19 flares outwardly at an angle of 1° to 10°, and most preferably about 5°, to the centerline axis of cylindrical conduit 15.

Figure 3:
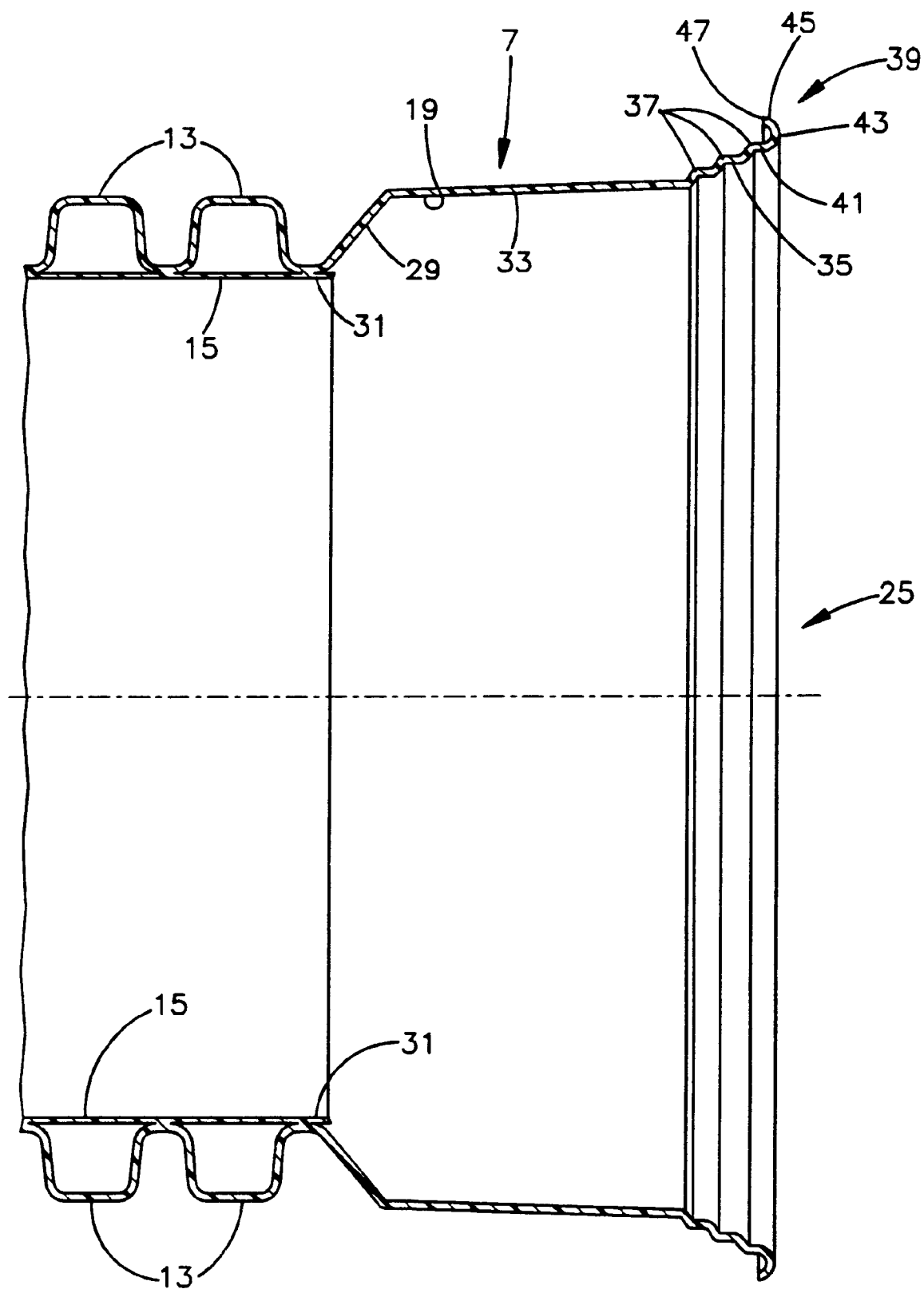
FIG. 3 is a cross sectional view taken through the centerline of the female connection portion of a pipe section according to the invention.

FIG. 3 shows an enlarged cross-section of the female connection 7. It will be understood that the cross section of the pipe section will be the same for all cross-sections through the centerline of the pipe because the form of the preferred embodiment is a shape of rotation with circular cross-sections. It will be understood that non-circular cross-section pipes, e.g., oval cross-sections, may also benefit from the present invention.

After the last corrugation 13, the female connection end 7 comprises a bell structure 27 with an opening generally indicated at 25, into which the male end 5 can be inserted. The bell structure 27 comprises a generally conical flare portion 29 which tapers longitudinally outward and radially outward from the end 31 of the cylindrical conduit 15. This taper extends to the wall portion 33 which provides the inwardly facing engagement surface 19 against which the sealing member 21 of the male end 5 engages. Wall portion 33 tapers outward at an angle of about 1° to 10°, and most preferably about 5°, as indicated above.

Longitudinally outward of engagement surface 19, the wall portion 33 includes a further flared second flare section 35. 25 This flare section 35 flares outward at a flare of about 15° to 30°, and most preferably about 20° from the centerline of the conduit 15 and preferably has a longitudinal length of about 1 to 2 inches, and most preferably 1.5 inches.

To rigidify the end opening 25 of female connection 7, the flare portion 35 is also provided with a plurality of small corrugations or crimps 37 which provide a ribbed annular portion which extends around the circumference of the conical flare section 35. In the preferred embodiment there are three crimps 37, but it will be understood that depending on the thickness of wall used and the length of this flare section 35, more or fewer crimps may be used.

Flare portion 35 is flared out at an angle of about 20°, which allows for insertion of the male end 5 into the female connection 7 with some degree of angular play. In common installation of such pipe sections, a trench is dug and the pipe section of 20 feet in length is lowered by the use of machinery such as a back hoe. As the pipe is lowered into the trench it may be fairly difficult to ensure that the axis of the second pipe section aligns with the axis of the first pipe section perfectly. The angulation of flare portion 35 allows for some play or tolerance in the alignment, in certain good embodiments up to as much as 20 or even 30° as the male end 5 is settled into the female connection 7.

The wall portion 33 extends to a longitudinal terminal end indicated at 39. This longitudinal terminal end 39 is provided with a reinforcing rim structure which keeps the shape of the mouth 25 of the female connection 7 circular.

Figure 4:
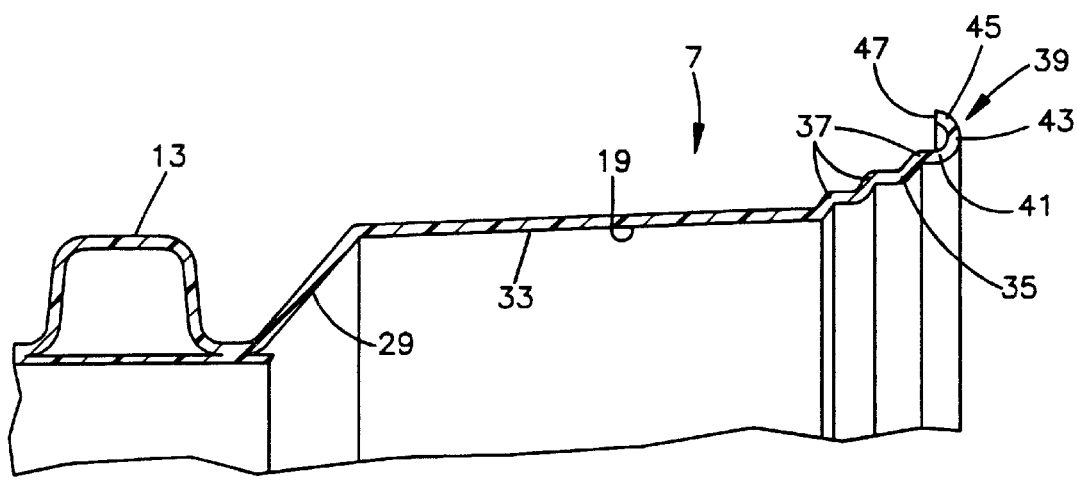
FIG. 4 shows an enlarged partial view of FIG. 3.

As best seen in FIG. 4, the reinforcing structure comprises a first portion 41 formed integral with the distal end of the second flare portion 35. This first portion 41 extends longitudinally outward of the pipe section 3. Formed integral with the first section is a second section 43 which curves to extend radially outward from first portion 41. The third portion 45 is formed integral with second portion 43 and this extends backwards in a longitudinal direction towards the longitudinal center of the pipe section 3, spaced from the first portion 41. Third portion 45 has a terminal end portion 47 which is spaced from the first portion 41.

These annular structures combine to form an annular reinforcing structure which is roughly a U-shaped channel.

The U-shaped channel has a curved cross-section taken through the centerline of the pipe section. The radius of curvature of this channel is preferably about 1.25 times the thickness of the material of the flare portion, although the radius may be as large as 4 times the thickness of the material.

When the bell 7 is formed by extrusion it has a substantially uniform thickness throughout. The preferred thickness varies with the size of the pipe. A 12-inch diameter pipe will preferably have a thickness of about 0.110 to 0.112 inches. A 30-inch inside diameter pipe will preferably have thicker material, about 0.185 inches, and a 60-inch inside diameter pipe will preferably be of material about 0.25 inches thick.

The combination of the reinforcing structure and the 20° flare is remarkably sturdy, structure, as much as about five times stronger than the same pipe without the flare or reinforcement. A deformation test comparing two 12" pipes, one with a flare and reinforced rim as described herein, and the other identical, but with no rim or flare, yielded striking results. A 5% deformation of the unflared and unreinforced pipe required a compressive lateral load of 26 pounds. To achieve the same 5% deformation in the reinforced and flared pipe required a load of 122.5 pounds.

The curving structure of this reinforcing ring formed by the portions 41, 43 and 45 also provides an additional benefit in that no corners project either in a longitudinal direction or radially. During assembly of the female connection 7 with the male end 5, the roundness of all corners prevents the end portion 39 from catching the resilient sealing member 21 and dislodging it from its position on the first corrugation 23 in the male portion 5 and also significantly reduces the insertion force.

FIGS. 5 through 10 show alternate embodiments that can also be used to reinforce the end of the female connection 7. The same reference numbers are used for similar parts in these embodiments.

Figure 5:
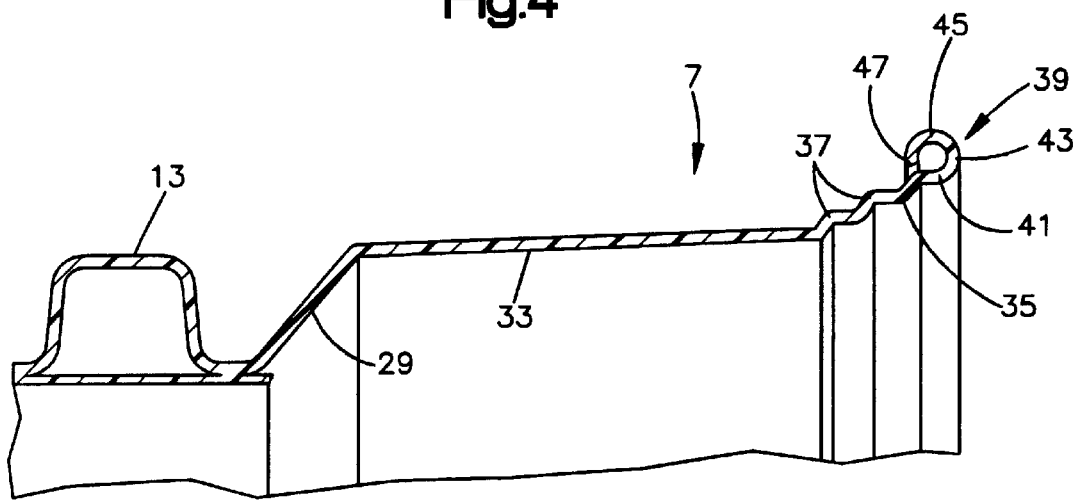
FIGS. 5 to 10 are enlarged views similar to that of FIG. 4, showing alternate embodiments of the invention herein.

FIG. 5 shows an alternate embodiment in which the third annular portion 45 is curved so that the terminal end 47 thereof contacts the outer side of flare portion 35. The result is that the reinforcing structure defined by the three elements of portions 41, 43 and 45 is a tubular structure reinforcing the rim of female connection portion 7.

Figure 6:
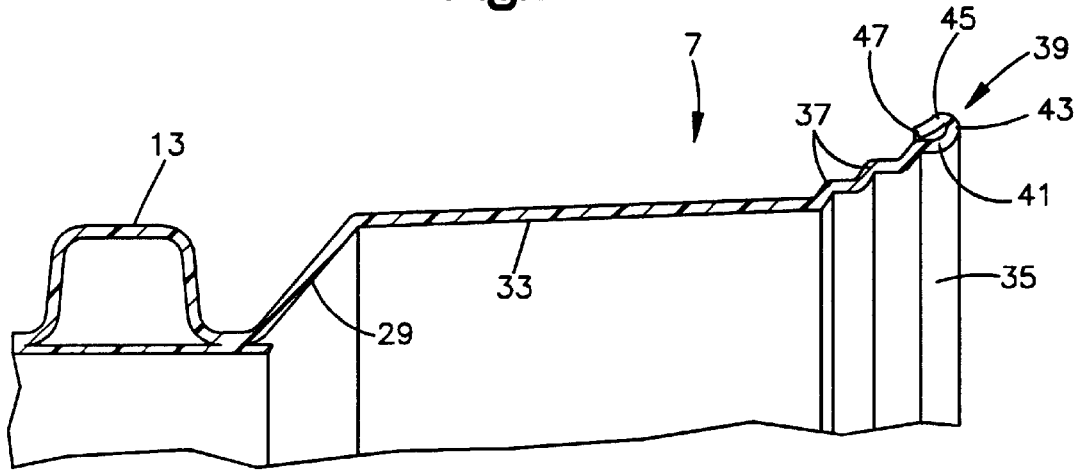

In FIG. 6, a further alternate embodiment is shown wherein the third portion 45 is pressed inward so that the third portion 45 lies adjacent to and engaging the first portion 41 on its radial outside surface.

Figure 7:
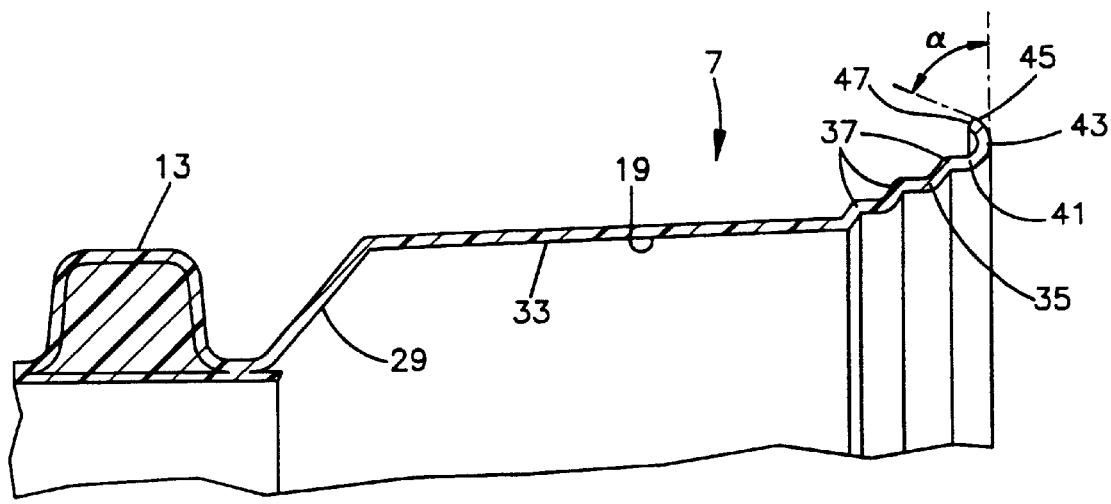

Referring to FIG. 7, a further alternate embodiment is shown wherein the curvature of the reinforcing structure at the end of the female connection 7 does not have a curvature as pronounced as that in the embodiment of FIG. 5. Instead of having the curvature of approximately a complete semicircle, the embodiment of FIG. 8 has a cross-section which is less than a semicircle and wherein the tangent to the terminal end portion 47 of the third portion 45 is at an angle a from the perpendicular passing through the longitudinal axis of the pipe section. This angle α is preferably less than 90° and more than about 10, to produce some sort of channel structure in the rim. In the embodiment shown, the angle α is about 60°.

Figure 8:
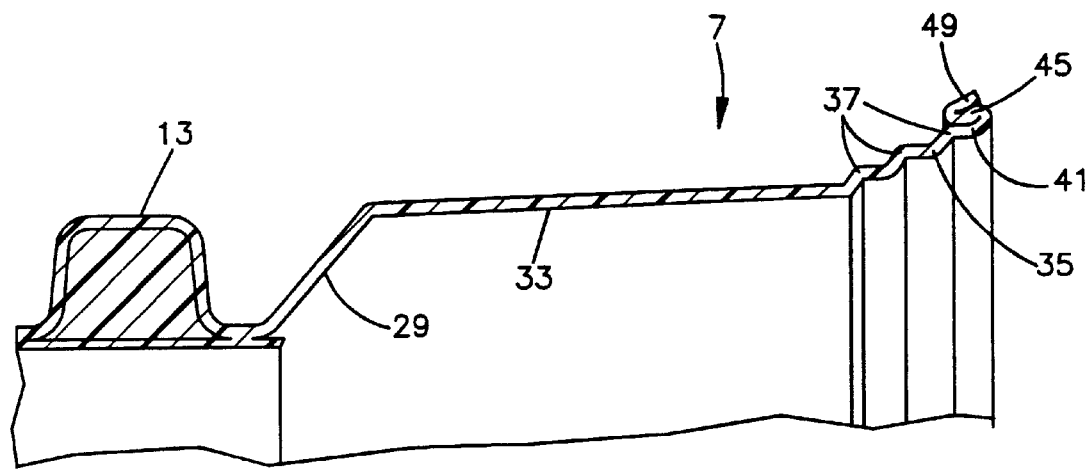

Referring to FIG. 8, an embodiment is shown wherein the third portion 45 of the reinforcing structure is connected to a further outwardly disposed portion 49 which engages and overlies the radially outer surface of third portion 45 so as to provide a generally S-shaped reinforcing structure at the mouth of female connection 7.

Figure 9:
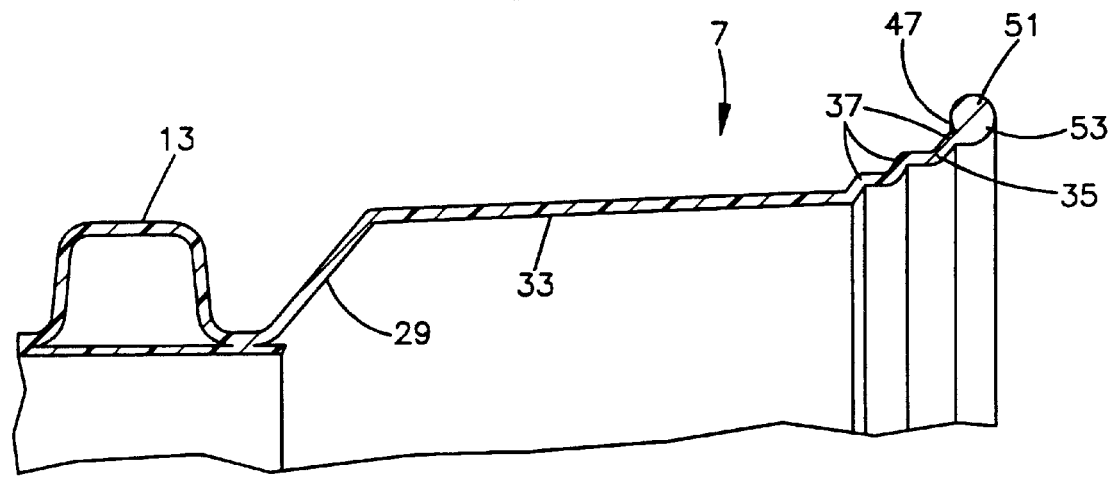

A further alternate embodiment is disclosed in FIG. 9, wherein an annular bead 51 is formed around the outside of terminal end 53. This bead 51 is annular and reinforces outer rim 53 against deformation out of a desired shape in a fashion similar to the reinforcing structures of FIGS. 4 through 8.

This bead 51 may be formed by reforming the end of the extruded bell of female connection 7 without any additional material. An alternate possibility is that the bead 51, which is of the same material as used for the extrusion, which is preferentially high density polyethylene, is additional material applied around the longitudinal terminal end 53 of the formed flare portion 35. The application of this bead 51 is under conditions sufficient to cause it to fuse with the material of the flare portion 35 and structurally unite with that member. This bead may be applied as a string of polyethylene or other suitable material wrapped around the flare portion 35, or as a loop of polyethylene material which is shrunk around the flare portion 35.

It will be understood that reinforcement structures such as the bead need not be at the terminal end of the female connection, but may provide beneficial structural reinforcement when spaced slightly inward from the end, so long as the reinforcement is in the end region of the pipe to prevent deformation of the end.

It will also be understood that these embodiments are exemplary of reinforcement structures, and that other cross-sectional structures may be readily devised by those of skill in the art.

Figure 10:
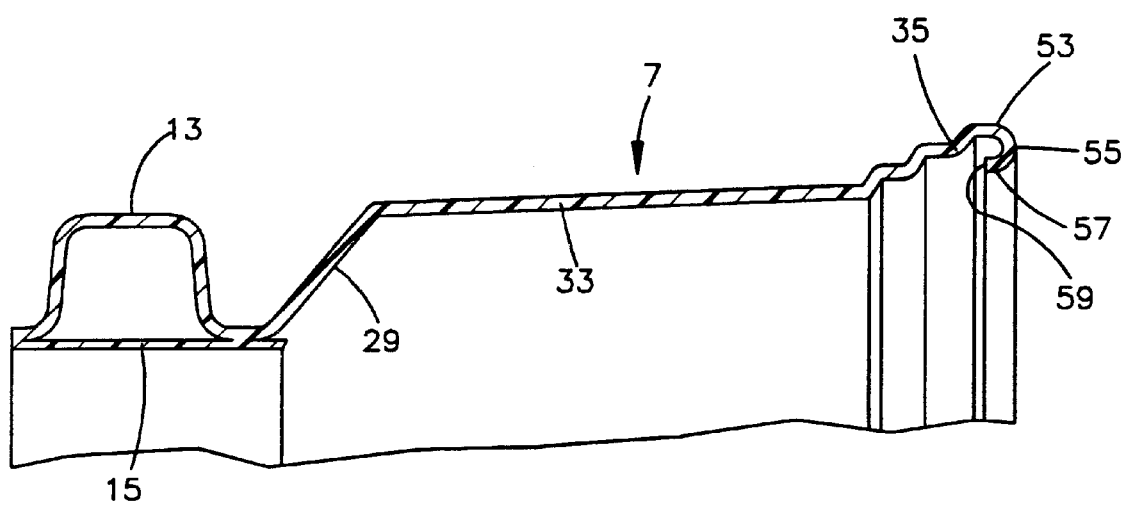

FIG. 10 shows another alternative embodiment which can be applied not only to the rim structure indicated in FIG. 4 but to the reinforcing rim structures of FIGS. 5 through 9, as well. As seen in FIG. 10, the curvature of the reinforcing structure may be reversed so that it extends radially inwardly of the flared portion 35. In FIG. 10, the reinforcing structure consists of a first portion 53 extending longitudinally outwardly, a second portion 55 extending radially inwardly and a third portion 57 which extends back longitudinally towards the longitudinal center of the pipe section 3. The inward terminal end 59 of this inward reinforcement structure is spaced inwardly from the first portion 53.

The configuration of this reinforcing structure may be varied so it can have a cross-section similar to that of the embodiment of FIG. 6 (a tube structure), FIG. 7 (a folded structure), FIG. 8 (a less than semicircular arch), or FIG. 9 (an S-shaped, folded structure). It will also be understood that the same concept can be applied to the structure of FIG. 10, wherein the bead 51 would be mounted on the radial inside of the lip 53 of the mouth of the female connection.

The preferred method of manufacture of the pipe sections of the invention is by extrusion of polymer material. Particularly preferred is the corrugated pipe extrusion method discussed in U.S. Pat. No. 5,296,188, and/or embodied in the Corma, Inc., system sold under the model designation "3020".

Such a system produces a generally continuous corrugated tube which is cut into separate pipe sections.

Figure 11:
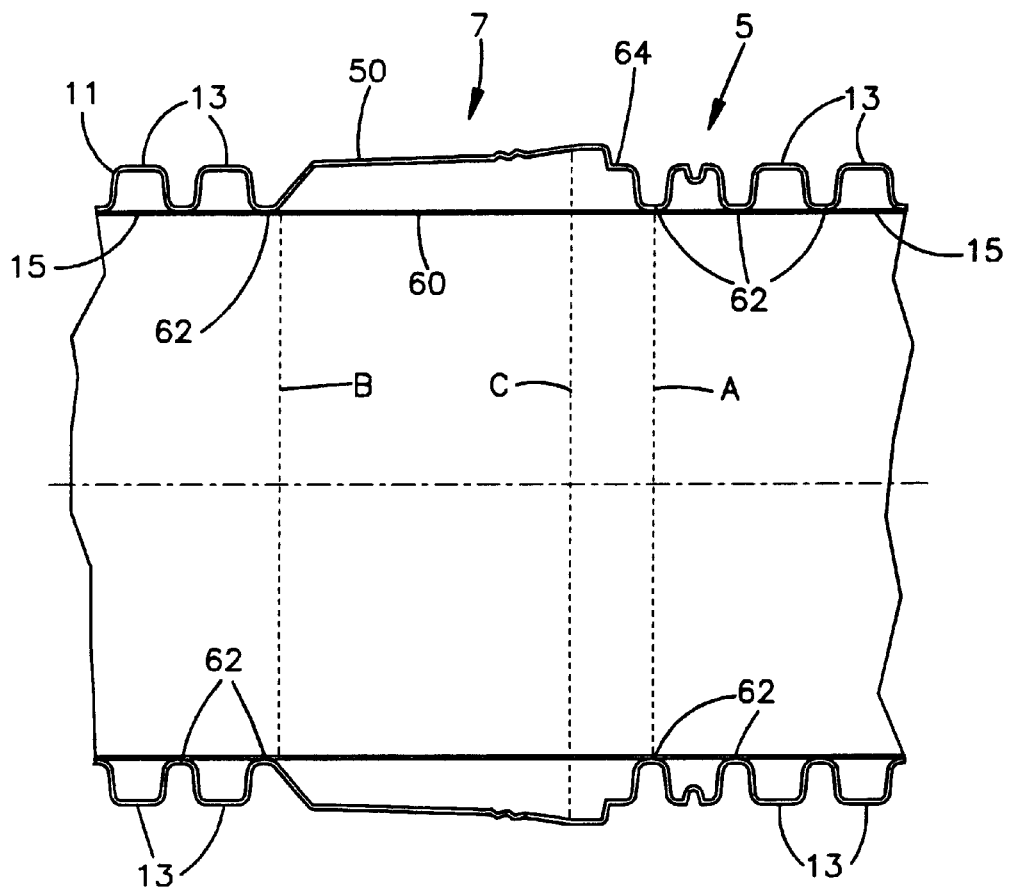
FIG. 11 is a cross-sectional view of a pipe section of the invention during manufacture.

FIG. 11 shows a segment of the continuous tube which is cut to form the male and female ends 5 and 7. The corrugated tube comprises two tubular parisons or sheets of extruded material, preferably of a thermoplastic nature, such as HDPE, which parisons have a substantially constant thickness over the length of the pipe. The outer parison 50 comprises the bell 7, including crimps 37, and the pipe structure 11 with the corrugations 13. The inner parison 60 is a generally cylindrical tube which constitutes the conduits 15 of the pipe sections 3. Both parisons are of the same material and are bonded together at annular regions 62 during the extrusion process.

The first step of processing after extrusion is that the pipe sections are cut to separate them from each other. This is done by cutting completely through the extrusion at plane A of FIG. 11.

The next step of processing involves cutting through each of the parisons 50 and 60 with a skiving tool, which is usually a router held in place to cut through one of the extruded parisons while the pipe section is rotated. Two cuts are made, inner parison 60 being skived at plane B and outer parison 50 at plane C. This frees a portion, referred to as "top-hat" 64, which is recycled.

Figure 12:
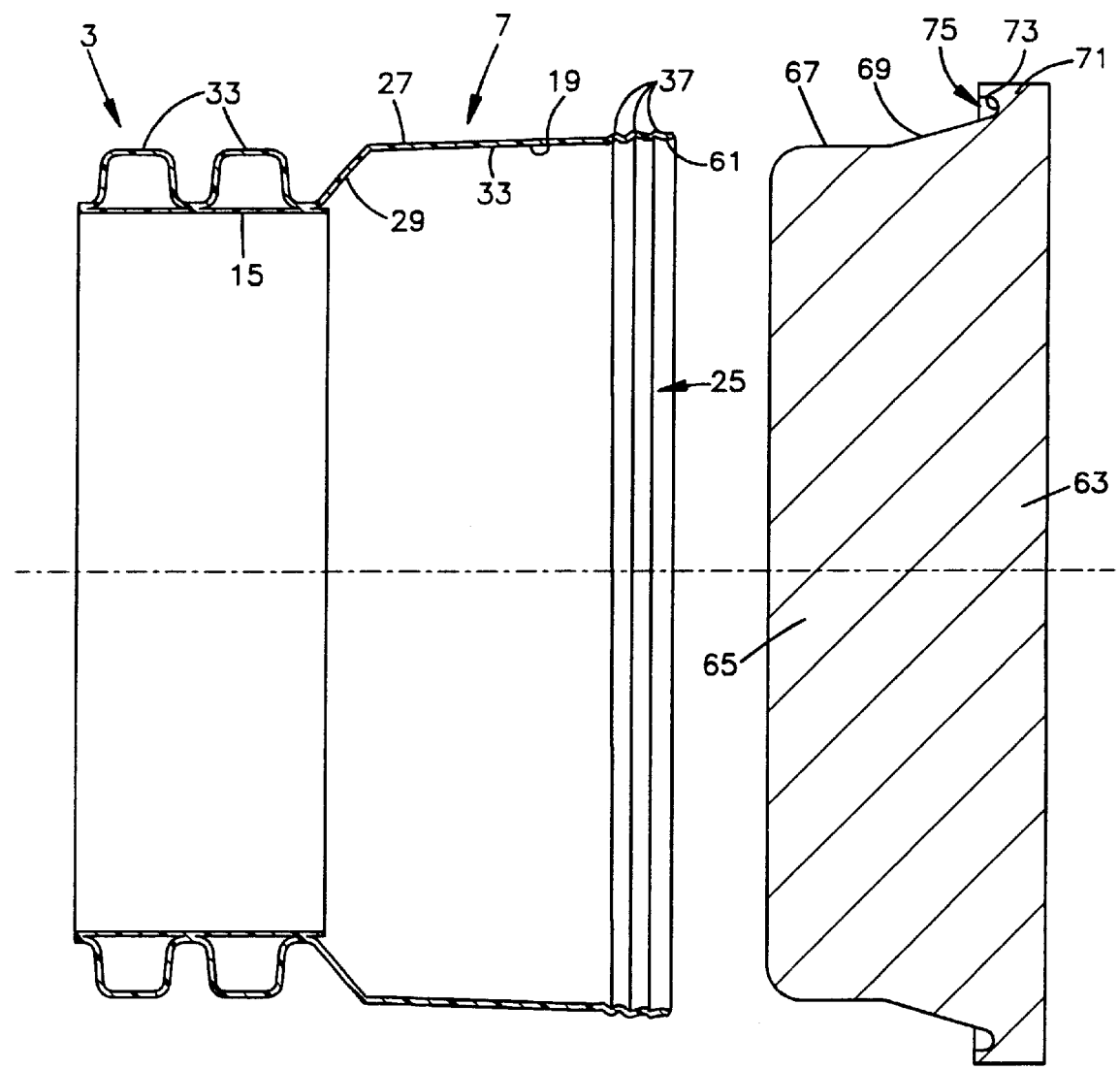
FIG. 12 shows the initial fabricated female connection portion and a mandrel used to form it into the final desired structure of the invention.

The resulting female end 7 has a cross-section as shown in FIG. 12.

As an alternative to this arrangement which requires skiving out the "top-hat" is that in the area of the bell the inner parison 60 may be pressed outward to form a double-walled bell shape. Such a structure would only require a single cut, to separate the pipe sections. The interior shape would be correct without further skiving needed.

At this point, the pipe wall portion 33 has a longitudinal end 61 which extends generally along the line of the generally conical surface 19 of wall 33. It is this end 61 that is formed into the rim structure.

In order to introduce the rim structure, the female connection 7 and a mandrel 63 are pressed together so the mandrel enters into the opening 25 of the female connection 7.

As best seen in FIG. 12, the mandrel 63 comprises a central body portion 65 which is generally circular about the central axis of the pipe section 3. This may be solid, or it may be toroidal, with a hole in the middle and a similar radially outward configuration. The central portion 65 fits into the opening 25 at the end of the pipe section, and this first portion of the mandrel has a generally cylindrical outer wall 67. The cylindrical outer wall 67 blends into a flaring frustoconical wall 69, which flares outwardly at approximately 20° to impart a flare to the end structure 61 of the female connection 7.

The frustoconical surface 69 extends flaringly outward to pocket structure 71, which includes a curving surface 73 which curves from the outer end of the frustoconical section upwardly and then back in a longitudinal direction towards the end section of the pipe structure, forming an annular pocket or trough generally indicated at 75.

In this stage of fabrication, the thermoplastic material is either heated by a secondary source or the mandrel itself may be heated to soften this material and make it pliable to form the reinforcing structure. The softened end of the pipe is then pressed into the mandrel, by movement of either the pipe or the mandrel, or both together.

The engagement of the pipe with the mandrel is at specified temperature, pressure and duration. For a 12 inch inner diameter pipe with a 0.112 inch wall thickness, the end of the pipe is heated to about 350° F., and the mandrel and pipe are pressed together with a force of about 400 pounds. The engagement is maintained for about 15 to 20 seconds, which imparts the proper shape to the pipe. These parameters, it will be understood, vary with the size of pipe, and may be varied even with the same size pipe.

Figure 13:
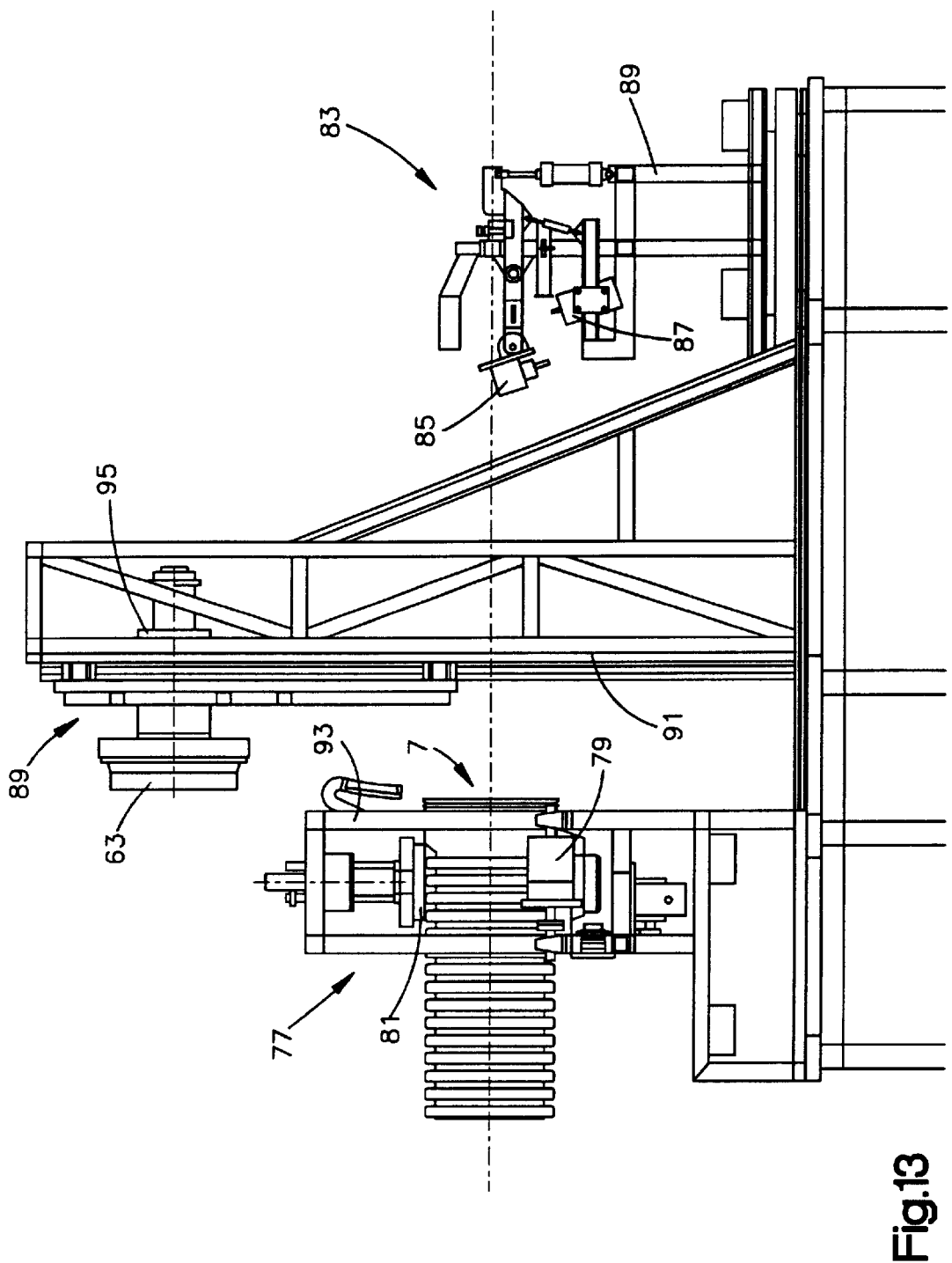
FIG. 13 shows an apparatus for forming the reinforced rim structure in a pipe section.

An apparatus particularly preferred for finishing the female end 7 of the pipe section 3 is shown in FIG. 13. The female end 7 of the pipe is held in a rotary station indicated at 77 between rollers 79 and 81 that rotate the pipe 3 in place.

First, skiving device 83, which has two routing devices 85 and 87 mounted on a moving carriage, moves laterally to place the skiving device in operative position at the end 7 of the pipe 3. As the pipe is rotated, the top-hat (not shown in FIG. 13) is cut out. The skiving device 83 is then retracted to the position shown in FIG. 13.

Mandrel device 89 then descends on vertical track 91 to line up with the end 7 of pipe 3. Heating device 93, preferably a gas torch or a quartz radiant heater, is then activated to heat and soften the material at the end of pipe 3. The mandrel 63 is supported on pneumatic cylinder structure 95, which, when activated, presses the mandrel 63 into engagement with the end 7 of the pipe 3, forming the reinforcement structure on the pipe.

The mandrel 63 is then retracted and the mandrel device 89 moves up to its starting position shown in FIG. 13.

The pipe is then cooled and allowed to set. Cooling may be assisted with an air mister.

Other systems for pressing the engagement of the pipe end with the mandrel can readily be assembled by one of ordinary skill in the art. For example, a yoke that grips the end of the pipe may be attached to a pneumatic press with the mandrel thereon which, when activated, presses the mandrel against the end of the pipe.

Different mandrel designs can be used to obtain the rim structures of alternate embodiments shown in FIGS. 5 to 10.

For example the embodiment of FIG. 8 is preferably obtained by the mandrel arrangement as seen in FIG. 14. Mandrel 97 has a sloping conical surface 99 which terminates at an abutment surface 101. A spot heating element 105 applies heat to a middle third of the annular end portion 103 while the mandrel 97 and pipe 3 are being rotated relative thereto. As the end portion 103 is pushed against the abutment surface 101, the softened middle portion folds to form the S-shaped reinforcement.

The radially inwardly disposed reinforcement structure shown in FIG. 10 is preferably formed by a mandrel 107 as seen in FIG. 9.

FIG. 16 shows a preferred embodiment for formation of a bead 51 as seen in FIG. 9. The mandrel 109 is rotated adjacent a rotating roller 111, which co-acts therewith to shape the bead 51 at the end of pipe 3.

The terms used herein are intended to be terms of description rather than limitation, as those knowledgeable in the art with this specification in hand will be able to make modifications therein without departing from the spirit of the invention.

What is claimed is:

1. A pipe section, which comprises a segment of polymeric material configured as a conduit with a corrugated wall, said conduit having an end portion which is flared, and which is strengthened by a reinforcing structure formed integrally of said material around the periphery of said end, said structure including a portion which extends back away from said end.

2. The pipe assembly of claim 1, wherein the flared portion flares at an angle of about 15° to 30° relative to the longitudinal axis of the conduit.

3. The pipe assembly of claim 2, wherein the angle is about 20°.

4. The pipe assembly of claim 1, wherein the flared portion includes at least one rigidifying crease structure, said crease structure being annular and extending substantially around the flared portion.

5. A pipe section comprising:
   inner and outer longitudinally extending generally tubular parisons each of high density polyethylene material and formed by extrusion, each parison having a respective substantially constant thickness throughout;
   the inner parison comprising a substantially cylindrical longitudinally extending conduit having a passage therein for fluids to pass through the pipe section, said conduit having two longitudinal ends and an outer surface;
   said outer parison comprising a corrugated structure surrounding the conduit and affixed to the outer surface thereof and a bell structure formed integral with the corrugated structure adjacent one of the ends of the conduit and projecting longitudinally outward therefrom;
   said corrugated structure having a male connection structure secured adjacent the other end of the conduit, said bell structure forming a female connection structure configured to sealingly receive therein another male connection structure having a configuration substantially the same as said male connection of the pipe section;
   the bell structure comprising:
      a first flare section connected with the corrugated structure adjacent the associated end of the conduit and projecting longitudinally and radially outward therefrom, said flare section including a radially inwardly disposed generally conical engagement surface tapering outwardly at an angle of about 1 to 10° and configured to sealingly engage said other male connection structure when placed in the bell structure;
      a second flare portion formed integral with and projecting radially and longitudinally outwardly from an outer end portion of the first flare portion and tapering outwardly at an angle of about 15 to 30° for a distance of about 1 to 2 inches;
      said second flare portion including a longitudinal terminal end portion of the bell structure, said terminal end portion defining in the female connection a generally circular end opening communicating with the passage in the conduit;
      the terminal end portion including a reinforcement structure comprising
         a first annular portion formed integral with the second flare portion and extending longitudinally outwardly therefrom;
         a second annular portion formed integral with the first annular portion and extending radially outwardly therefrom;
         a third annular portion formed integral with the second annular portion and extending longitudinally inward therefrom;
         said reinforcing structure being formed by shaping the terminal end portion to turn back on itself so that the reinforcing structure has a channel or tubular cross-section.

6. A pipe assembly for accommodating fluid flow therethrough, which includes
   a first pipe section comprising a length of polymeric material configured as a conduit and having a male end and a female end, said first pipe section's female end being flared and being strengthened by a reinforcing structure formed integrally of said material around the periphery of said female end, said structure including a portion which extends back away from said end, and
   a second pipe section comprising a length of polymeric material configured as a conduit and having a male end and a female end;
   said male end of said second pipe section being in the female end of the first pipe section such that fluid may flow from one of said sections into the other.

7. A pipe assembly comprising:
   first and second pipe sections;
   the first pipe section comprising a longitudinally extending tubular first conduit portion having a longitudinal end and a female connection portion on said end, said female connection portion having a first opening therein and said conduit portion having a passage therein communicating with the first opening;
   the second pipe section comprising a longitudinally extending tubular second conduit portion with a longitudinal end and a male connection portion on said end, said male connection having a second opening therein and the second conduit portion having a passage therein communicating with the second opening;
   said female connection portion receiving the male connection portion therein so that the passage in the first pipe section communicates with the passage in the second pipe section and so that fluid can move through the pipe assembly by passing through said conduit portions and said connection portions;
   said female connection portion comprising a first connection portion connected with the end of the conduit portion and extending in a longitudinal direction therefrom, said female connection portion including a longitudinal annular terminal end portion extending around said first opening and including a first annular portion formed integral with the first connection portion and extending therefrom generally longitudinally outwardly of the first pipe section;

a second annular portion formed integral with the first annular portion and extending generally radially inwardly or outwardly from the first annular portion; and a third annular portion formed integral with the second annular portion and extending longitudinally inwardly of the first pipe section therefrom;

said first, second and third annular portions together forming a generally circular reinforcement structure which strengthens the terminal end portion to preserve a circular shape thereof.

8. The pipe assembly of claim 7, wherein the first pipe section further comprises a corrugated outer structure, the first conduit portion having an outer surface, said corrugated outer structure surrounding and being affixed to said outer surface.

9. The pipe assembly of claim 8, wherein said corrugated outer structure is of the polymeric material, said corrugated outer structure being formed integral with said female connection portion, the corrugated outer structure and the female connection portion having a substantially uniform thickness.

10. The pipe assembly of claim 7, wherein said first connection portion includes a flare portion adjacent the terminal edge portion, said flare portion flaring radially outwardly and longitudinally outwardly of the first pipe section, thereby facilitating alignment of the first and second pipe section during assembly of the pipe assembly.

11. The pipe assembly of claim 7, wherein said second annular portion extends radially inwardly from the first annular portion and supports the third annular portion radially inwardly of the first annular portion.

12. The pipe assembly of claim 7, wherein said second annular portion extends radially outwardly from the first annular portion and supports the third annular portion radially outwardly of the first annular portion.

13. The pipe assembly of claim 7, wherein the third annular portion has a terminal end directed longitudinally inwardly of the first pipe section.

14. The pipe assembly of claim 13 and said first connection portion providing a radially inward facing engagement surface, and said male connection portion supporting thereon a gasket, said gasket engaging the engagement surface so as to substantially seal the connection between the male and female connection portions to resist escape of fluid from inside said pipe assembly; and said first, second, and third annular portions being curvingly configured so that the terminal end portion of the female connection portion has no corners directed radially inwardly and longitudinally outwardly of the first pipe section that could contact and dislodge the resilient seal member from the male connection portion during assembly of the first and second pipe sections.

15. The pipe assembly of claim 7, wherein said polymeric material is high density polyethylene.

16. The pipe assembly of claim 8, wherein the corrugated outer structure and the first conduit portion are formed simultaneously by extrusion of thermoplastic material.

17. The pipe assembly of claim 7, and said female connection portion being formed by extrusion of thermoplastic material.

18. The pipe assembly of claim 17 and said first connection portion providing a radially inward facing engagement surface adapted to engage a resilient sealing member supported on said male connection portion so as to substantially seal the connection between the male and female connection portions to resist escape of fluid from inside said pipe assembly and resist flow of external fluids into the pipe assembly; and said reinforcement structure being curvingly configured so that the terminal end portion of the female connection portion has no corners directed radially inwardly and longitudinally outwardly of the first pipe section that could contact and dislodge the resilient seal member from the male connection portion during assembly of the first and second pipe sections.

19. The pipe assembly of claim 17, wherein the reinforcement structure has a cross section taken through the axis of the conduit portion which cross-section is a channel shape.

20. The pipe assembly of claim 17, wherein the reinforcement structure has a cross section taken through the axis of the conduit portion which cross-section is a U-shape.

21. The pipe assembly of claim 17, wherein the reinforcement structure has a cross section taken through the axis of the conduit portion which cross-section is an arcuate shape of between 100° and 180°.

22. The pipe assembly of claim 17, wherein the reinforcement structure has a cross section taken through the axis of the conduit portion which cross-section is a tubular configuration.

23. The pipe assembly of claim 17 wherein the reinforcement structure has a cross section taken through the axis of the conduit portion which cross-section is an S-shape.

24. The pipe assembly of claim 17, wherein the reinforcement structure has a cross section taken through the axis of the conduit portion which cross-section is that of a substantially solid bead of material.

25. The pipe assembly as defined in claim 18, wherein said connection resists flow of external fluids into the pipe assembly.

26. A pipe section which comprises a segment of polymeric material configured as a conduit having an end strengthened by a reinforcing structure formed integrally of said material around the periphery of said end, said structure including a portion which extends back away from said end, wherein the hoop strength of said end is at least 10 pounds.

27. A pipe section as defined in claim 26, wherein the hoop strength of said end is at least 15 pounds.

28. A pipe section comprising:

a longitudinally extending tubular first conduit portion having a longitudinal end and a female connection portion on said end, said female connection portion having a first opening therein and said conduit portion having a passage therein communicating with the first opening;

the female connection portion being adapted to receive therein in said opening a male connection of a second pipe section;

said female connection portion being formed as an extrusion of polyethylene material having a substantially constant thickness throughout, said female connection portion comprising a first connection portion connected with the end of the conduit portion and extending generally in a longitudinal direction therefrom, and an annular longitudinal terminal end portion extending around said first opening, said longitudinal terminal end portion including a generally annular reinforcement structure formed integral with and around the terminal edge portion, which reinforcement structure strengthens the terminal end portion to preserve the shape thereof and of the first opening;

said first connection portion including an angulated flare portion supporting the terminal edge portion, said flare portion flaring radially outwardly and longitudinally outwardly of the first pipe section adjacent the terminal edge portion;

wherein said reinforcement structure extends radially inwardly from the terminal end portion.

29. A pipe section comprising:

a longitudinally extending tubular first conduit portion having a longitudinal end and a female connection portion on said end, said female connection portion having a first opening therein and said conduit portion having a passage therein communicating with the first opening;

said female connection portion being adapted to receive therein in said opening a male connection of a second pipe section;

said female connection portion being formed as an extrusion of polyethylene material having a substantially constant thickness throughout, said female connection portion comprising a first connection portion connected with the end of the conduit portion and extending generally in a longitudinal direction therefrom, and an annular longitudinal terminal end portion extending around said first opening, said longitudinal terminal end portion including a generally annular reinforcement structure formed integral with and around the terminal edge portion, which reinforcement structure strengthens the terminal end portion to preserve the shape thereof and of the first opening;

said first connection portion including an angulated flare portion supporting the terminal edge portion, said flare portion flaring radially outwardly and longitudinally outwardly of the first pipe section adjacent the terminal edge portion;

wherein said reinforcement structure extends radially outwardly from the terminal end portion.

30. A pipe assembly comprising:

a first pipe section;

the first pipe section comprising a longitudinally extending tubular first conduit portion having a longitudinal end and a female connection portion on said end, said female connection portion having a first opening therein and said conduit portion having a passage therein communicating with the first opening;

said female connection portion being adapted to receive therein in said opening a male connection of a second pipe section;

said female connection portion comprising:
 a first connection portion connected with the end of the conduit portion and extending generally in a longitudinal direction therefrom; and
 a flare portion extending from the first connection portion and being angulated with respect thereto so that said flare portion tapers radially and longitudinally outwardly of the first connection portion;
 said flare portion including an annular longitudinal terminal end portion distal to the conduit portion and extending around said first opening;
 said longitudinal terminal end portion including a generally annular reinforcement structure formed integral therewith, said reinforcement structure strengthening the terminal end portion to preserve the shape thereof and of the first opening, wherein said reinforcement structure extends radially inwardly from the terminal end portion.

31. A pipe assembly comprising:

a first pipe section;

the first pipe section comprising a longitudinally extending tubular first conduit portion having a longitudinal end and a female connection portion on said end, said female connection portion having a first opening therein and said conduit portion having a passage therein communicating with the first opening;

the female connection portion being adapted to receive therein in said opening a male connection of a second pipe section;

said female connection portion comprising:
 a first connection portion connected with the end of the conduit portion and extending generally in a longitudinal direction therefrom; and
 a flare portion extending from the first connection portion and being angulated with respect thereto so that said flare portion tapers radially and longitudinally outwardly of the first connection portion;
 said flare portion including an annular longitudinal terminal end portion distal to the conduit portion and extending around said first opening;
 said longitudinal terminal end portion including a generally annular reinforcement structure formed integral therewith, said reinforcement structure strengthening the terminal end portion to preserve the shape thereof and of the first opening, wherein said reinforcement structure extends radially outwardly from the terminal end portion.

32. A pipe assembly comprising:

a first pipe section;

the first pipe section comprising a longitudinally extending tubular first conduit portion having a longitudinal end and a female connection portion on said end, said female connection portion having a first opening therein and said conduit portion having a passage therein communicating with the first opening;

the female connection portion being adapted to receive therein in said opening a male connection of a second pipe section;

said female connection portion comprising:
 a first connection portion connected with the end of the conduit portion and extending generally in a longitudinal direction therefrom; and
 a flare portion extending from the first connection portion and being angulated with respect thereto so that said flare portion tapers radially and longitudinally outwardly of the first connection portion;
 said flare portion including an annular longitudinal terminal end portion distal to the conduit portion and extending around said first opening;
 said longitudinal terminal end portion including a generally annular reinforcement structure formed integral therewith, said reinforcement structure strengthening the terminal end portion to preserve the shape thereof and of the first opening;
 said first connection portion providing a radially inward facing engagement surface adapted to engage a resil ient sealing member supported on said male connection portion so as to substantially seal the connection between the male and female connection portions to resist escape of fluid from inside said pipe assembly; and said reinforcement structure being curvingly configured so that the terminal end portion of the female connection portion has no corners directed radially inwardly and longitudinally outwardly of the first pipe section that could contact and dislodge the resilient seal member from the male connection portion during assembly of the first and second pipe sections.

33. A pipe assembly comprising:

a first pipe section;

the first pipe section comprising a longitudinally extending tubular first conduit portion having a longitudinal end and a female connection portion on said end, said female connection portion having a first opening therein and said conduit portion having a passage therein communicating with the first opening;

the female connection portion being adapted to receive therein in said opening a male connection of a second pipe section;

said female connection portion comprising:

a first connection portion connected with the end of the conduit portion and extending generally in a longitudinal direction therefrom; and a flare portion extending from the first connection portion and being angulated with respect thereto so that said flare portion tapers radially and longitudinally outwardly of the first connection portion;

said flare portion including an annular longitudinal terminal end portion distal to the conduit portion and extending around said first opening;

said longitudinal terminal end portion including a generally annular reinforcement structure formed integral therewith, said reinforcement structure strengthening the terminal end portion to preserve the shape thereof and of the first opening, wherein the reinforcement structure has a cross section taken through the axis of the conduit portion which cross-section is a channel shape.

34. A pipe assembly comprising:

a first pipe section;

the first pipe section comprising a longitudinally extending tubular first conduit portion having a longitudinal end and a female connection portion on said end, said female connection portion having a first opening therein and said conduit portion having a passage therein communicating with the first opening;

the female connection portion being adapted to receive therein in said opening a male connection of a second pipe section;

said female connection portion comprising:

a first connection portion connected with the end of the conduit portion and extending generally in a longitudinal direction therefrom; and a flare portion extending from the first connection portion and being angulated with respect thereto so that said flare portion tapers radially and longitudinally outwardly of the first connection portion;

said flare portion including an annular longitudinal terminal end portion distal to the conduit portion and extending around said first opening;

said longitudinal terminal end portion including a generally annular reinforcement structure formed integral therewith, said reinforcement structure strengthening the terminal end portion to preserve the shape thereof and of the first opening, wherein the reinforcement structure has a cross section taken through the axis of the conduit portion which cross-section is a U-shape.

35. A pipe assembly comprising:

a first pipe section;

the first pipe section comprising a longitudinally extending tubular first conduit portion having a longitudinal end and a female connection portion on said end, said female connection portion having a first opening therein and said conduit portion having a passage therein communicating with the first opening;

the female connection portion being adapted to receive therein in said opening a male connection of a second pipe section;

said female connection portion comprising:

a first connection portion connected with the end of the conduit portion and extending generally in a longitudinal direction therefrom; and a flare portion extending from the first connection portion and being angulated with respect thereto so that said flare portion tapers radially and longitudinally outwardly of the first connection portion;

said flare portion including an annular longitudinal terminal end portion distal to the conduit portion and extending around said first opening;

said longitudinal terminal end portion including a generally annular reinforcement structure formed integral therewith, said reinforcement structure strengthening the terminal end portion to preserve the shape thereof and of the first opening, wherein the reinforcement structure has a cross section taken through the axis of the conduit portion which cross-section is an arcuate shape of between about 100° and 180°.

36. A pipe assembly comprising:

a first pipe section;

the first pipe section comprising a longitudinally extending tubular first conduit portion having a longitudinal end and a female connection portion on said end, said female connection portion having a first opening therein and said conduit portion having a passage therein communicating with the first opening;

the female connection portion being adapted to receive therein in said opening a male connection of a second pipe section;

said female connection portion comprising:

a first connection portion connected with the end of the conduit portion and extending generally in a longitudinal direction therefrom; and a flare portion extending from the first connection portion and being angulated with respect thereto so that said flare portion tapers radially and longitudinally outwardly of the first connection portion;

said flare portion including an annular longitudinal terminal end portion distal to the conduit portion and extending around said first opening;

said longitudinal terminal end portion including a generally annular reinforcement structure formed integral therewith, said reinforcement structure strengthening the terminal end portion to preserve the shape thereof and of the first opening, wherein the reinforcement structure has a cross section taken through the axis of the conduit portion which cross-section is a tubular configuration.

37. A pipe assembly comprising:

a first pipe section;

the first pipe section comprising a longitudinally extending tubular first conduit portion having a longitudinal end and a female connection portion on said end, said female connection portion having a first opening therein and said conduit portion having a passage therein communicating with the first opening;

the female connection portion being adapted to receive therein in said opening a male connection of a second pipe section;

said female connection portion comprising:
 a first connection portion connected with the end of the conduit portion and extending generally in a longitudinal direction therefrom; and
 a flare portion extending from the first connection portion and being angulated with respect thereto so that said flare portion tapers radially and longitudinally outwardly of the first connection portion;
 said flare portion including an annular longitudinal terminal end portion distal to the conduit portion and extending around said first opening;
 said longitudinal terminal end portion including a generally annular reinforcement structure formed integral therewith, said reinforcement structure strengthening the terminal end portion to preserve the shape thereof and of the first opening, wherein the reinforcement structure has a cross section taken through the axis of the conduit portion which cross-section is an S-shape.

38. A pipe assembly comprising:

a first pipe section;

the first pipe section comprising a longitudinally extending tubular first conduit portion having a longitudinal end and a female connection portion on said end, said female connection portion having a first opening therein and said conduit portion having a passage therein communicating with the first opening;

the female connection portion being adapted to receive therein in said opening a male connection of a second pipe section;

said female connection portion comprising:
 a first connection portion connected with the end of the conduit portion and extending generally in a longitudinal direction therefrom; and
 a flare portion extending from the first connection portion and being angulated with respect thereto so that said flare portion tapers radially and longitudinally outwardly of the first connection portion;
 said flare portion including an annular longitudinal terminal end portion distal to the conduit portion and extending around said first opening;
 said longitudinal terminal end portion including a generally annular reinforcement structure formed integral therewith, said reinforcement structure strengthening the terminal end portion to preserve the shape thereof and of the first opening, wherein the reinforcement structure has a cross section taken through the axis of the conduit portion which cross-section is that of a substantially solid bead of material.

\* \* \* \* \*